United States Patent [19] [11] 3,725,866
Oldfield, Jr. et al. [45] Apr. 3, 1973

[54] DATA COMMUNICATION SYSTEM

[75] Inventors: Homer R. Oldfield, Jr., Weston; Edward B. Rawson, Lincoln; Daniel B. Schwarzkopf, Stow, all of Mass.

[73] Assignee: Searle Medidata, Inc., Waltham, Mass.

[22] Filed: Mar. 8, 1971

[21] Appl. No.: 121,938

[52] U.S. Cl. ............................................340/172.5
[51] Int. Cl. ............................................G06f 3/04
[58] Field of Search ....................340/172.5; 235/157

[56] References Cited

UNITED STATES PATENTS

| | | | |
|---|---|---|---|
| 3,626,382 | 12/1971 | Pedersen et al. | 340/172.5 |
| 3,400,378 | 9/1968 | Smith et al. | 340/172.5 |
| 3,500,936 | 2/1971 | Busch | 340/172.5 |
| 3,539,998 | 11/1970 | Belcher et al. | 340/172.5 |
| 3,588,834 | 6/1971 | Pedersen et al. | 340/172.5 |
| 3,399,385 | 8/1968 | Gorman et al. | 340/172.5 |

*Primary Examiner*—Paul J. Henon
*Assistant Examiner*—Mark Edward Nusbaum
*Attorney*—Weingarten, Maxham & Schurgin

[57] ABSTRACT

A data communication system especially adapted for multi-phasic health screening in which stations remote from a central processor by a link of significant communications delay are communicative with the system identically as local stations operative in the system without delay.

13 Claims, 8 Drawing Figures

INVENTORS
HOMER R. OLDFIELD JR.
EDWARD B. RAWSON
DANIEL B. SCHWARZKOPF
BY

ATTORNEYS

INVENTORS
HOMER R. OLDFIELD JR.
EDWARD B. RAWSON
DANIEL B. SCHWARZKOPF
BY
Weingarten Maxham & Schurgin
ATTORNEYS INVENTORS
HOMER R. OLDFIELD JR.
EDWARD B. RAWSON
DANIEL B. SCHWARZKOPF
BY
Weingarten, Maxham & Schurgin
ATTORNEYS INVENTORS
HOMER R. OLDFIELD JR
EDWARD B. RAWSON
DANIEL B. SCHWARZKOPF
BY
Weingarten Maxham & Schurgin
ATTORNEY INVENTORS
HOMER R. OLDFIELD JR.
EDWARD B. RAWSON
DANIEL B. SCHWARZKOPF
BY
ATTORNEYS INVENTORS
HOMER R. OLDFIELD JR.
EDWARD B. RAWSON
DANIEL B. SCHWARZKOPF
BY
Wenzington Mackam + Schwarzkopf
ATTORNEYS

DATA COMMUNICATION SYSTEM

FIELD OF THE INVENTION

This invention relates to data communication systems and more particularly to a system for communication with a plurality of stations, one or more of which are interconnected with a central station by a transmission path of significant delay.

BACKGROUND OF THE INVENTION

In a multi-phasic health screening system described in copending patent application now U.S. Pat. No. 3,566,365, assigned to the assignee of the present invention, a plurality of stations are communicative with a central data processor operative to convey information to the several stations and to receive data therefrom. Each of the stations is coupled to the central processor by a transmission line such as a coaxial cable which is of sufficient bandwidth to carry information thereon at the full data rate of the associated electronic apparatus. The transmission line also has a delay characteristic such that the transmission time between the stations and the central processor is insignificant with respect to system operation. In many instances, it is desirable to couple a remotely located station or group of stations to a central processor via a telephone line or other communication link for operation in the system together with local stations. As used herein, the term "local stations" will refer to those stations coupled to the central processor via a communication path of insignificant communication delay, while the term "remote station" will refer to those stations coupled to the central processor via a communication path of more limited bandwidth and having a significant communication delay by reason of reduced data transmission speed, as well as the transmission delay of the communication link.

In the system described in the aforesaid copending application, a computer is coupled to a data scanner operative to sequentially address the plurality of stations and, during the time that each station is addressed, to receive data from that station or to convey data thereto. All of the stations are on line with the data scanner at all times but are communicative therewith only during the time interval in which the station is addressed. Communication between the data scanner and the respective local stations occurs within a time interval which is substantially greater than any time delay occasioned by transmission through the system cable, and thus delay in the transmission path is not a significant factor in system operation. However, when it is intended that a remote station communicate with the data scanner via a telephone line or other transmission path of reduced transmission capacity and/or significant transmission delay time, serious problems arise in accommodating delayed data from a remote station along with the more rapidly conveyed data from local stations.

SUMMARY OF THE INVENTION

In accordance with the present invention, a data communication system is provided especially adapted for multi-phasic health screening in which one or more stations remote from a central processor by a link of significant communications delay are communicative with the system identically as local stations operative in the system without material delay. Data received by the central station and transmitted therefrom to both local and remote stations is identical insofar as the central station is concerned; in other words, the central station is communicative with remote stations in substantially the same manner and with the same effect as in communication with local stations.

Briefly, the invention employs a remote data scanner coupled to the data scanner of the central processor, the remote scanner being communicative with the remote stations via one or more telephone lines or other transmission links of known time delay. Each transmission link is operative via a transponder located at the remote end thereof to communicate with one or more remote stations. Data to be conveyed to a remote station is transmitted at a faster rate to the remote scanner, which then transmits this information at a slower rate commensurate with the capacity of the transmission line to the remote station via the associated transponder. Similarly, data from a remote station is transmitted via the transponder at a slower rate over the transmission link to the remote scanner, which then conveys this information at the faster rate back to the central processor.

It is a particular feature of the invention that the remote data scanner is employed in a time shared manner with a plurality of transmission links, each link capable of communication with one or more remote stations. A time slot is associated with each station in the data system and certain of these time slots are assigned to the remote stations for use in conjunction with the other time slots associated with the local stations. By virtue of the invention, a greater number of stations in a multi-phasic health screening system or other data system are communicative with a single computer and, since the computer is often a significant portion of the overall system cost, the sharing of a single computer by both local and remote stations results in more economical system operation.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
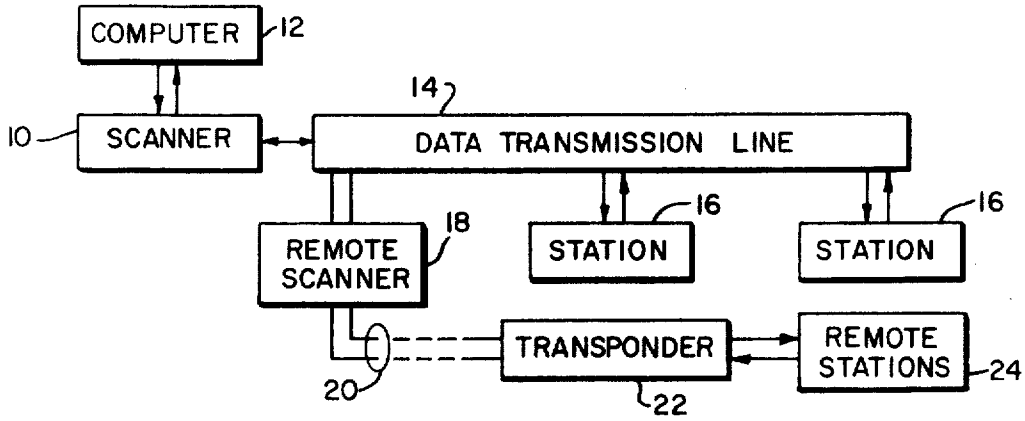
FIG. 1 is a block diagram of a multi-station data system in accordance with the present invention.

The multi-phasic medical screening system in which the present invention is especially useful employs a plurality of medical testing stations, each coupled via a system transmission line to a central processor which includes a computer and a data scanner. Such a system is broadly illustrated in FIG. 1 and includes a scanner 10 coupled to a computer 12 and also coupled to a data transmission line 14 which includes separate transmitting, receiving and clock lines. A plurality of stations 16 are coupled to transmission line 14 for communication with scanner 10. The scanner 10 is operative to sequentially address each station 16 during a time slot associated with each station, and during each time slot, convey information from computer 12 to the particular station and to also convey information from that station to the computer for storage and processing. The scanner 10 in a preferred embodiment is itself the subject of copending patent application Ser. No. 59,996 assigned to the same assignee as the present invention. In the data system described in the aforesaid copending application, 50 time slots are employed, 48 associated with respective stations and two time slots for testing purposes. For each station 16, one half of the associated time slot is employed for transmission of data from scanner 10 to the station and for transmission from the station to scanner 10. The bandwidth of transmission line 14 is sufficient to permit transmission of data thereon at the full rate of the associated electronic apparatus. The delay characteristics of line 14 are also small compared with the transmission time of data being conveyed thereon, with a result that transmission delay along line 14 does not affect system operation.

It is the purpose of the present invention to permit additional stations separated from the system by a transmission line of significant communications delay to be operative in the system without elaborate alteration of data format or system configuration. Referring again to FIG. 1, a remote scanner 18 is coupled to transmission line 14 for communication with scanner 10, and is also coupled, via a communication link 20 of known delay characteristics, to a transponder 22 located at the opposite end of link 20. The transponder is coupled to one or more remote stations 24 which, for example, can be one or more of the stations associated with multi-phasic health screening as described in the aforesaid U.S. Pat. No. 3,566,365. The communication line 20 is typically a leased four wire telephone line having a known and constant transmission delay to provide full duplex communication.

In the embodiment to be presently described, the invention is operative to couple up to three remote stations on a single line 20 to remote scanner 18. Additional remote stations can be coupled to scanner 18 by means of other similar communication links. By means and in a manner to be described, the invention permits one or more remote stations to be communicative with scanner 10 with the same effect as though these remote stations were local to the central processor. Scanner 10 is modified only slightly from that shown in the aforesaid copending application Ser. No. 59,996 for use with remote scanner 18, and by virtue of the invention the remote stations appear to the central processor the same as local stations 16.

In communicating with stations 16, scanner 10 addresses each station 16 during a respective time slot during which data is conveyed from computer 12 to that station and from that station to the computer. In communicating with a remote station 24, data being received from a remote station is delayed with respect to data transmitted to the station by reason of the communications delay over line 20. Two time slots are provided for each remote station 24, these time slots being separated in time by the round trip delay between station 24 and scanner 10. During the first of these two time slots, scanner 10 provides the address and data for a particular remote station 24, while during the second of these time slots data from the addressed station 14 is received by scanner 10.

In a typical system, 48 time slots are provided for communication with 48 stations. Each station utilizes a 24 bit data frame and in the illustrated embodiment a 24 bit frame is shifted out in 16 milliseconds. The communication delay of link 20 from scanner 18 is specified to be 40 milliseconds, 7 milliseconds transmission line delay and 33 milliseconds transmission time. Thus, a time slot for data being returned by a remote station 24 to scanner 18 is removed from the time slot of the data transmitted to that station by 40 milliseconds. Each communication link 20 can be connected to up to three remote stations 24, and three 24 bit frames can be transmitted over each link to the associated remote stations. For communication with the remote stations, a data cycle of 75 bits is employed on each communication link, this cycle being composed of three 24 bit frames plus three sync bits. The 75 bit data format has an overall cycle time of 50 milliseconds.

Figure 2:
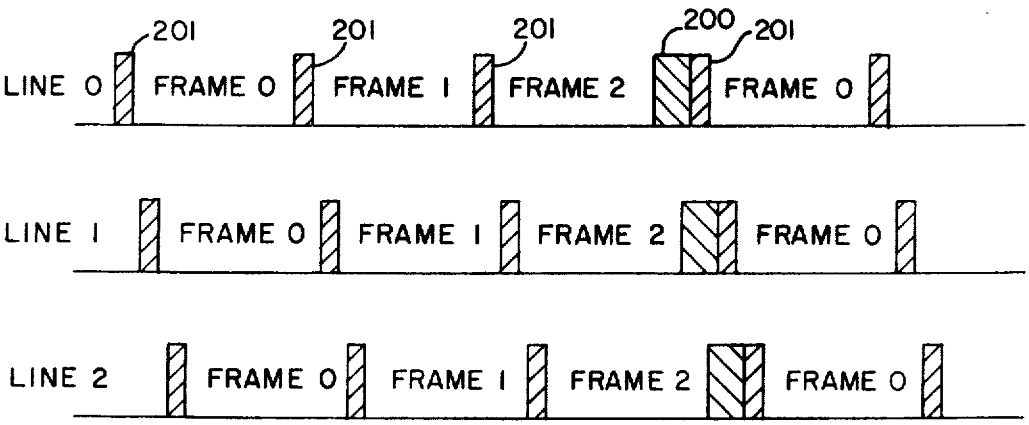
FIG. 2 is a diagrammatic representation of the data format employed in the invention.

The data format is depicted in FIG. 2. For each communication line, each data cycle includes three 24 bit data words, labeled Frame 0, Frame 1 and Frame 2, and three sync bits at the end of Frame 2. Each word of each data cycle is sequentially transmitted on a respective communication line 20, after which the second word of the data cycle is successively transmitted and then the third word thereof. The transmissions on successive communication lines are offset from line to line by one millisecond, as illustrated. After transmission of the three frames on a communication line, the three sync bits are transmitted. At the transponder 22 at the receiving end of the communication line, the sync bits are detected and in the absence of such detection a resynchronization operation is commenced. Resynchronization is also begun if no station returns data to transponder 22. High speed shifting of the data words occurs in a 500 microsecond interval 201 after Frame 0, Frame 1 and sync bits 200. Up to 16 communication lines can be employed in the illustration embodiment of the invention.

Figure 3:
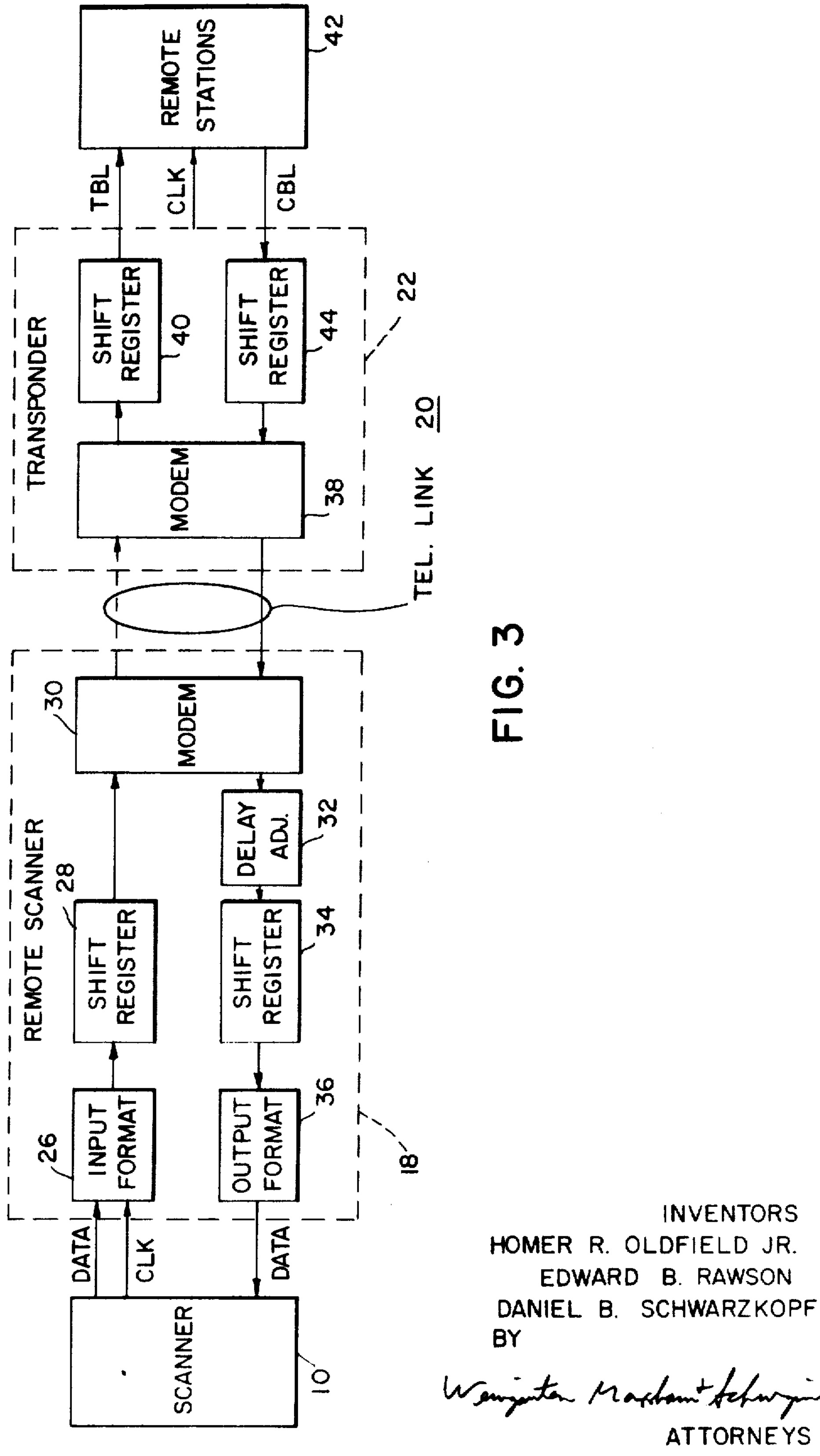
FIG. 3 is a block diagram of the remote scanner and transponder embodying the invention.

The remote scanner 18 and transponder 22 are illustrated in greater detail in FIG. 3. A single channel is depicted herein for clarity. As will be described, the remote scanner actually includes a plurality of shift registers and modems for use with a plurality of telephone links 20. Likewise, a transponder is employed for each channel. Data and clock information from scanner 10 are applied to an input format circuit 26 of remote scanner 18, the circuit 26 providing signals to scanner 18 of proper format for logical processing therein. An example of such formatting is shown in above-referenced patent U.S. Pat. No. 3,566,365. The signals from circuit 26 are applied to the serial input of a shift register 28 which has its serial output connected to the transmitting channel of a model modem 30. The receiving channel of modem 30 has its output connected by way of a delay adjusting circuit 32 to the serial input of a shift register 34, the output of which is applied via output format circuitry 36 to scanner 10. Format circuit 36 adjusts the pulse format to a form compatible with the logic circuit requirements of scanner 10.

The modem 30 is connected to a respective four wire telephone line of fixed delay, which is part of link 20, one pair of wires being employed for transmission, the other pair being employed for reception to provide full duplex communication. The modem is per se well known in the data communication art and provides modulated pulses in response to pulse information received from shift register 28 for conveyance over a transmitting pair of line 20, and for receiving modulated pulses from a receiving pair of line 20 and providing in response thereto demodulated pulses for application to shift register 34. The delay adjusting circuit 32 is a digital network operative to adjust the time delay of pulse signals therethrough and is employed to initially adjust the round-trip delay time between scanner 18 and transponder 22 to a predetermined fixed value.

The transponder 22 is located at the remote end of link 20 and includes a modem 38 similar to modem 30 having the output of its receiving channel connected to the serial input of a shift register 40. The output of a shift register 44 is connected to the input of the transmitting channel of modem 38. The output of shift register 40 is coupled to a relatively wide bandwidth transmission line (TBL), while the input of shift register 44 is coupled to a similar transmission line (CBL). The one or more remote stations 42 are coupled to the TBL and CBL lines and also receive clock signals from a clock line (CLK) also coupled to transponder 22.

The TBL and CBL lines are equivalent in function to the data transmission line 14 to which local stations 16 are coupled, and data is conveyed from transponder 22 to the associated remote station or stations 42 and from such stations to transponder 22 in similar manner to transmission between local stations 16 and data transmission line 14. However, data is transmitted by remote scanner 18 to transponder 22 and from transponder 22 back to scanner 18 at a substantially slower rate over interconnecting link 20 by reason of the rather limited bandwidth of this line, and, according to the invention, information being conveyed to the remote stations is reconveyed to remote scanner 18 and thence to scanner 10 in precisely determined time intervals such that the central processor, and specifically scanner 10, is communicative with both local stations and remote stations without any necessity for system redesign and without adverse affect on local station operation.

Figure 4:
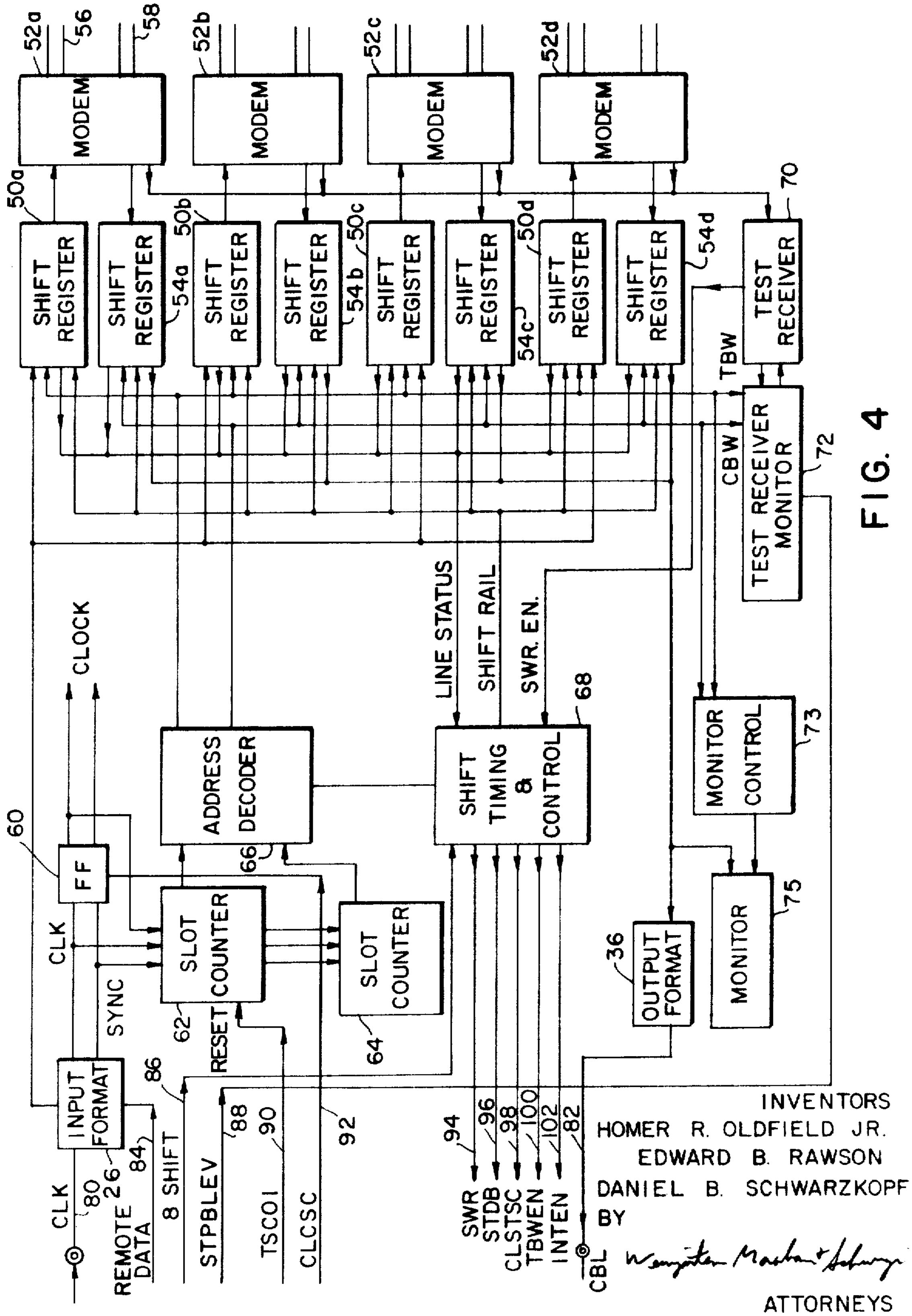
FIG. 4 is a more detailed block diagram of the remote scanner according to the invention.

The remote scanner 18 is shown more particularly in FIG. 4. Data from scanner 10 for one or more remote stations is applied to input format circuit 26 which also receives clock signals from scanner 10. The data, after appropriate formatting by circuit 26, is applied to the input of a plurality of shift registers 50, the output of each register being connected to the transmitting channel of a respective modem 52. Each modem has its receiving channel coupled to a shift register 54 for receiving information from respective remote stations. The transmitting channel of each modem 52 is connected to a respective pair of wires 56 of each four wire telephone line, and the receiving channel connected to the other respective pair of wires 58 of each telephone line. Modem 52 is of standard design as shown in Data Access Arrangement CDT for Manual Originating and Answering Terminals, Bell System Data Communications Technical Reference, July 1970, and may comprise Sangamo Modem model Transidata T103A.

Timing within scanner 18 is developed by slot counters 62 and 64. Counter 62 receives clock and sync signals from format circuit 26 and an output signal from flip-flop 60. Counter 62 also receives reset signals from scanner 10 and provides an output signal to an address decoder 66 which also receives an input signal from counter 64. The counters 62 and 64 derive their timing from signals received from scanner 10 and initial gating levels are also provided by scanner 10 to cause these counters to run in a predetermined relation to associated counters in scanner 10. Clock and sync level signals are provided by format circuit 26 to flip-flop 60 which provides clocking signals for control of fast data transfer and incrementing of counters 62 and 64. The counter 64 is slaved to counter 62, and in the present embodiment runs ten slots behind counter 62. When counter 62 is at slot 10, the counter 64 is set to zero. The control signals from scanner 10 are applied to slot counters 62 and 64, decoder 66 and to shift timing and control circuitry 68 which governs shift timing of shift registers 50 and 54. Control information from scanner 18 to scanner 10 is also provided by circuitry 68. The counters 62 and 64 are out of step by a period of 40 milliseconds to provide appropriate timing of the time slots for input and output decoding of data received on the telephone lines.

Data for the remote stations is applied to all shift registers 50, and decoder 66 is operative to select the shift register 50 associated with a remote station to which particular information within a predetermined time slot is to be transmitted. This information is shifted out by means of a signal on the shift rail of control 68. Similarly, the decoder 66 is operative to select the shift register 54 of the associated time slot for receiving data from a selected remote station. Shift rail signals from control 68 again shift out data for the selected register. Each register 50 and 54 is coupled to control 68 for line status indication. If a telephone line is not in use or if there is lack of sync on a line, control 68 can provide an indication to scanner 10 that a particular time slot is inactive. The inactive slot could then be used, for example, for communication with local stations.

A test receiver 70 can be coupled to any modem 52 for monitoring data being transmitted and received on the several telephone lines. Data words are displayed on a test receiver monitor 72. The test receiver is also used to call for a test word from the scanner 10 switch register. The command switch enable (SWR EN) causes control circuit 68 to issue an SWR command to scanner 10 to cause a data word to be loaded from the scanner panel switches rather than from computer memory. This test word is loaded in the time slot selected by the test receiver. A monitor control circuit 73 can also be coupled to each shift register 50 and 54 for monitoring data from respective registers, with shift register data being displayed on monitor 75. By use of the monitor circuitry, terminal bound words and computer bound words for a selected transmission line and a selected frame may be examined for testing and diagnostic purposes. The monitor control 73 is operative to select a particular shift register 50 or 54 the contents of which are to be monitored, and the frame of data to be examined is selected by appropriate control of the time during which the selected shift register is interrogated, such time being determined from control signals provided by the scanner. Similarly, test receiver 70 is selectively communicative with any one of the modems 52 and either the transmitting or receiving channel of the selected modem is chosen together with an intended time frame to view corresponding data words being transmitted or received on the associated telephone line.

The test receiver 70 and monitor 72 is also employed to measure the delay of the transmission line when the system is initially installed such that the total communication delay is equal to the predetermined value. The test receiver 70 includes transition detection circuitry which drives an early and a late indicator which respectively indicate whether incoming data transitions are early or late with respect to the time at which the data is sampled. The sampling time or shift is adjusted, for example, by a panel control until neither the early nor late indicator is actuated, to thereby adjust the phase of the received signal.

The delay of the received signal is adjusted by selection of a tap of a multi-tap delay shift register by means of a suitable panel control. The test receiver is operative to transmit a test word derived from a switch register which is part of the data scanner described in the aforesaid copending application. A test word is selected which is an easily recognized pattern, such as starting with the least significant bit, a zero, a one, two zeros, a one, three zeros, a one, four zeros, a one, etc. The incrementing number of zeros is easily identified to determine the shifting of a received word. When the delay is proper this pattern will appear in a proper position on the monitor 72. When, however, the delay is incorrect, the test pattern will be shifted either to the right or to the left on the monitor indicators. The delay is adjusted via the delay shift register until the test pattern appears in its proper place on the monitor indicator. The panel switches of the test receiver can be calibrated to indicate the selected shift and delay tap. This same shift and delay can then be manually set in the delay adjusting circuitry 32 (FIG. 3) of the particular channel of remote scanner 18 with no necessity for panel controls of indicators on each of the several channels.

Figure 5:
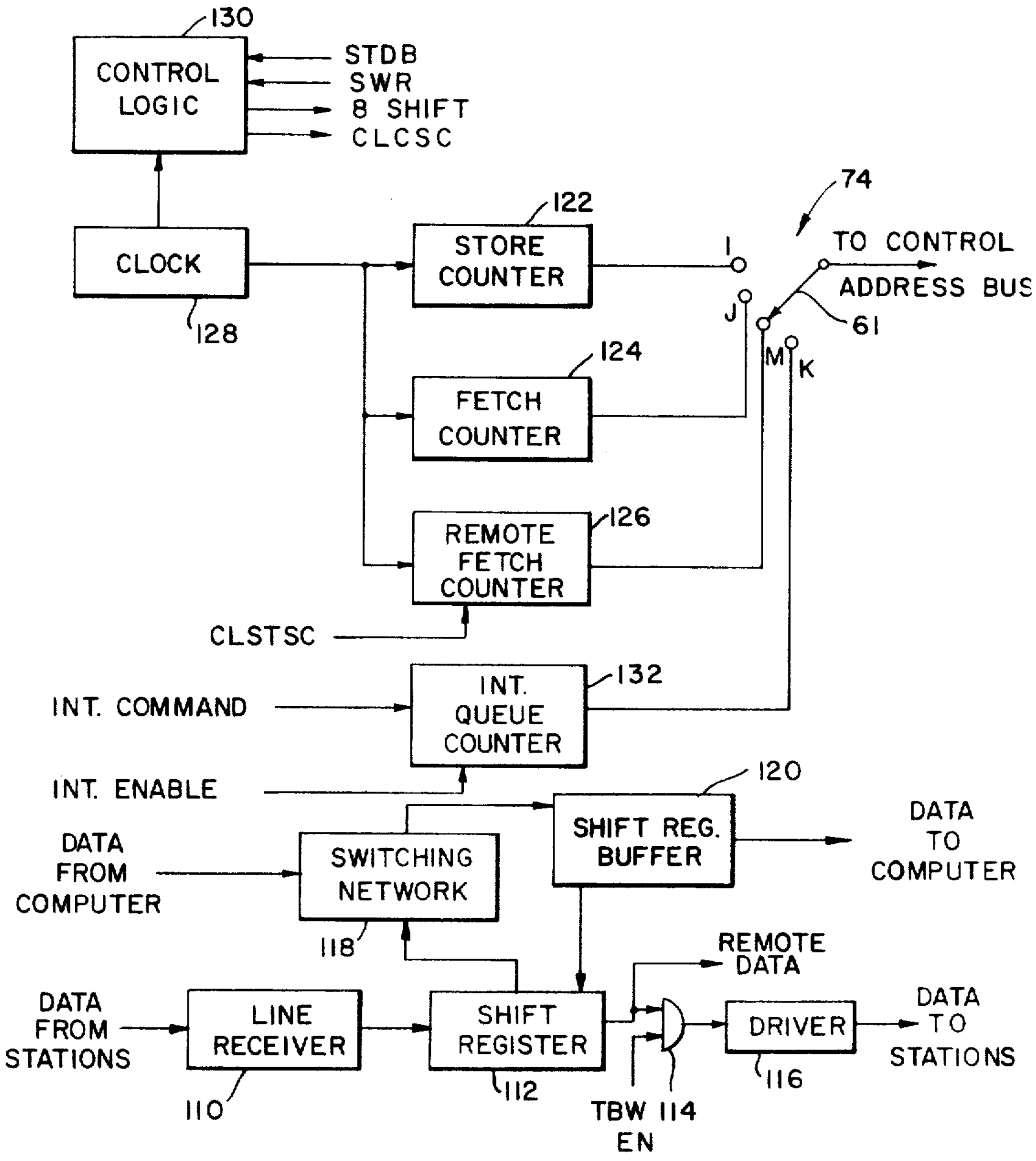
FIG. 5 is a block diagram of a portion of the central processor data scanner useful in illustrating operation of the invention.

Certain signals are provided to scanner 18 from scanner 10 and from scanner 18 to scanner 10 to maintain synchronous operation therebetween. A portion of scanner 10 is illustrated in FIG. 5 and will be briefly described to aid in understanding the mode of communication between scanner 10 and scanner 18. Detailed operation of scanner 10 is described in the above-identified copending application Ser. No. 59,996. Referring to FIG. 5, data from stations 16 is coupled to a line receiver 110 via transmission line 14 and the output signals from line receiver 110 are applied to a shift register 112. The output of shift register 112 is coupled via an AND gate 114 to a driver 116 operative to transmit data to stations 16 on the system transmission line 14. Data from shift register 112, which is the data for the local stations, is enabled by a command (TBW enable) applied to AND gate 114 from the control circuitry 68 of scanner 18. This enabling function assures that data for the remote stations is transmitted only to the remote stations not to the local stations. The parallel output of shift register 112 is coupled to a switching network 118 which is also coupled to a shift register buffer 120. Data from computer 12 is applied to switching network 118 and buffer 120 is operative to apply parallel data to the computer. The shift register buffer 120 is also coupled to the parallel input of shift register 112, and buffer 120 and register 112 are operative to provide parallel exchange of data therebetween. Switching network 118 as shown in the above-referenced application Ser. No. 59,996, comprises a means for selecting the input for shift register buffer 120.

In operation, serial data from the stations is loaded into shift register 112 and is then conveyed in parallel to shift register buffer 120 for conveyance to the computer. At the same time, data from the computer which has been loaded into buffer 120 is conveyed in parallel to shift register 112 for serial transmission to the stations. The addresses in computer memory in which data is to be stored are determined by counters 122, 124 and 126. More particularly, store counter 122 determines the address where data is to be stored in the computer, while fetch counter 124 determines the address of data fetched from the computer. Remote fetch counter 126 determines the address of the data which is to be conveyed to station 24.

A clock 128 drives counters 122, 124 and 126 and also drives control logic 130 which provides master timing signals such as 8 shift as a high rate clock output and CLCSC as marking periodic 50 millisecond cycles by standard logic to the scanner circuitry. Counter 122 is coupled to counter 124 such that the count held by store counter 122 is equal to the count held by fetch counter 124 during the previous time slot; that is, counters 122 and 124 operate one count out of step with one another. Interrupt commands are applied to an interrupt queue counter 132 which is incremented upon each received interrupt command. Counters 122, 124, 126 and 132 are each coupled to a respective terminal of a switching network 74. Network 74 is in actuality an electronic switch, the mechanical switch being illustrated for purposes of clarity only. The switching network is set to respective terminals I, J and M to convey corresponding slot number addresses to the computer. When an interrupt occurs, switching network 74 is set to terminal K to permit counter 132 to direct an address to a computer, this address being the core location where the slot number provided by store counter 122 is to be stored. The slot number itself is transferred as data to an interrupt queue table in computer memory.

In order for the computer to identify those stations requesting service, the scanner directs the contents of store counter 122, which are the slot numbers, to an interrupt queue table in computer memory. The numbers of the slots requiring service are sequentially placed in successive memory locations by the scanner and are removed from memory in the same order by the computer as the stations represented by these slots are serviced. The interrupt enable command from control circuitry in scanner 18 is applied to counter 132. A clear remote slot counter command (CLSTSC) is applied to counter 126 to set this counter to zero and assure that the counter runs 40 milliseconds ahead of the local system fetch slot counter 124. A data break command (STDB) is applied to control logic 130 as is the switch register load command (SWR) which indicates that data is to be loaded from a switch register rather than memory for diagnosis and testing purposes. Control logic 130 also provides control signals for remote scanner 18, namely a timing signal (8-shift) and a clear signal (CLCSC).

The interconnection between scanner 10 and scanner 18 is as follows. The clock (CLK) line 80 and the CBL line 82 are coupled to the corresponding lines which are part of the system transmission line 14 of the multi-station data system, such as described in the aforesaid copending patent application now U.S. Pat. No. 3,566,365. The data line 84 is separate from the transmitting data line of the system transmission line to permit separate gating of data for local stations 16. Lines 86, 88, 90 and 92 are from control circuitry in scanner 10 and provide timing signals to scanner 18 for maintaining synchronous operation between scanner 18 and scanner 10. The derivation of such timing signals in scanner 10 will be further described below.

Figure 6:
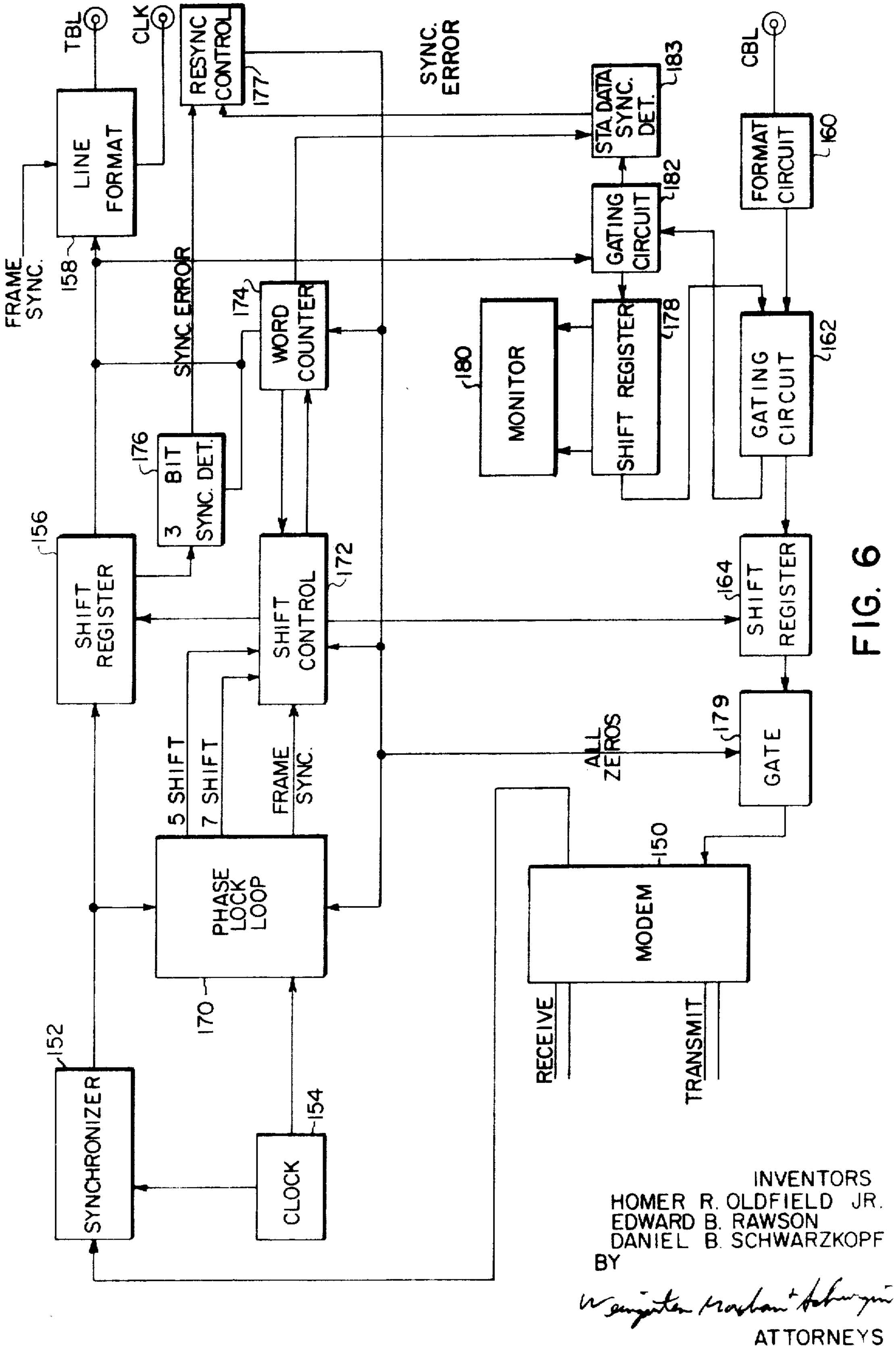
FIG. 6 is a block diagram of a transponder according to the invention.

The 8-shift signal on line 86 provides a timing signal derived from the master timing of scanner 10 which is eight times the low speed shift rate and provides a set of shift pulses which consists of two 660 millisecond intervals followed by a 680 millisecond interval to yield an average period of 667 milliseconds per bit. the rail signal is typically derived through a decoder as shown at page 256, FIG. 6.5.1 Hellerman, Digital Computer System Principles, Wiley, 1967, and may comprise a Fairchild model 9301 decoder and 9316 counter from the 8 shift line 86. Line 88 carries a control signal (STPB) which denotes the time during which data to be transmitted is loaded from panel switches rather than from computer memory for purposes of testing system operation. The signal on line 90 (TSC01) is a reset signal for setting counter 62 to zero at a selected time so that this counter runs in timed relation with the associated counter in scanner 10. The signal on line 92 (CLCSC) is employed to clear flip flop 60 during each 50 millisecond cycle.

The signals on lines 94, 96, 98, 100 and 102 provide status and command signals to scanner 10. More particularly, line 94 carries a command (SWR) which is a request to load data from a test switch register in scanner 10 instead of computer memory, as called for by a manual control on test receiver 70. The command (STDB) on line 96 requests a data break for the remote stations and will cause a break to a slot determined by the remote fetch counter in scanner 10. Line 98 carries a command (CLSTSC) which sets the remote fetch counter in scanner 10 to zero and assures that this counter runs 40 milliseconds ahead of local system fetch counter. A disable signal (TBWEN) is provided on line 100 which inhibits terminal bound words for local stations 16 when data for a remote station 24 is about to be received. Local station data is inhibited when data to a remote station is about to be transmitted. An interrupt inhibit signal (INTEN) on line 102 inhibits interrupt signals if a word is being received from a remote station which indicates a sync error. This latter command avoids spurious interrupts in the event that a transponder 22 is out of synchronization with the system. The logic function for the output lines 94, 96, 98, 100, and 102 may typically be implemented by the technique shown by pp. 168–186 of Hellerman, Digital Computer System Principles, Wiley 1967, and the components may be selected from logic gates of Series 54N/74N of Texas Instruments, Incorporated.

The transponder 22 is shown in greater detail in FIG. 6. A separate transponder is provided for each telephone line 20 and each transponder is operative to communicate with one or more remote stations associated therewith. In the present embodiment up to three remote stations can be coupled to a single transponder for communication with remote scanner 18. Referring to FIG. 6, the transmitting pair of the four wire telephone line carrying information from scanner 18 is connected to the receiving channel of a modem 150, the output of which is coupled to a synchronizer 152 operative to synchronize the received digital pulses with a local clock 154. Synchronizer 152 typically employs a standard design to bring clock and data pulses into line. A digital phase lock loop 170 receiving signals from synchronizer 152 and clock 154 effectively provides synchronization of clock 152 154 with the clock in scanner 18. The data from synchronizer 152 is applied to a shift register 156, the output of which is connected to a line format circuit 158 which, in turn, provides data and clocking information on respective output lines labeled TBL and CLK to which the remote stations are connected. Format circuit 158 provides pulse signal formats acceptable to the remote stations, these formats being the same as the signal formats employed by local stations 16.

Information from the remote stations is coupled via the line labeled CBL to a format circuit 160, the output of which is coupled to a gating circuit 162 through which information is coupled to a shift register 164. The output of shift register 164 is coupled to the transmitting channel of modem 150, the output of which is connected to the other pair of telephone lines 20. It will be appreciated that the data formats on the transmission line (TBL) carrying information to the remote stations, the transmission line (CBL) carrying information from the remote stations and the clock line (CLK) are the same as the data formats on the similarly named transmission lines of the multi-phasic health screening system described in the aforesaid copending application. Since the same data formats are employed throughout the system both for local and remote stations, any station can be disposed locally or remotely from the central processor depending upon particular system requirements.

Control of low speed and high speed data shifting is governed by shift control logic 172 which may typically include a Fairchild model 9020 dual flip-flop with an ANDed output to provide the function specified below. The data is shifted in at a slower rate to shift register 156 and after assembly of a complete word the data is shifted out at high speed by way of line format circuit 158 to the TBL line for communication to remote stations 42. The phase lock loop 170 assures that shifting is accomplished at proper times. Word counter 174 counts low speed shifts in order to determine when high speed shifting is to be accomplished. More particularly, counter 174 counts 24 shifts and then initiates a high speed shift.

It will be recalled that three extra bits are employed in each 50 millisecond frame which are used for synchronizing a frame interval. A three bit sync detector 176 determines whether these three bits are present at the proper time as determined by word counter 174. The sync bits are, in the present embodiment, always ones. If these three bits are not present, a sync error signal is provided by detector 176 to resync control 177 which, in turn, provides signals to word counter 174, shift control 172 and phase lock loop 170 to cease high speed shifts. The three sync bits occur immediately prior to the beginning of frame 0 of a succeeding data cycle, and the data of frame 0 should be in shift register 156 at the time the sync bits are detected by sync detector 176. If the three sync bits are not detected, indicating an out-of-sync condition, the resync counter 177 causes all zeros to be forced onto the telephone line via gate 179 for transmission to scanner 18. The scanner will not, therefore, receive any sync bits, which signifies that the remote end of the line is out of sync. At the end of a predetermined time period, the sync detector 176 is again enabled and looks for sync bits. The transmission of all zeros for data by scanner 18 during an out-of-sync condition allows the transponder to unambiguously detect the three sync bits. When this occurrs the transponder is synchronized, the three sync bits are returned to scanner 18 and data is once more transmitted by scanner 10. When the transponder is in synchronization, 24 low speed shifts are employed to shift a data word into shift register 156. A high speed shift then takes place to convey data from shift register 156 to the remote station. Another high speed shift takes place shifting data from a remote station into shift register 164, after which low speed shifting again takes place to convey the information to scanner 18.

Figure 7:
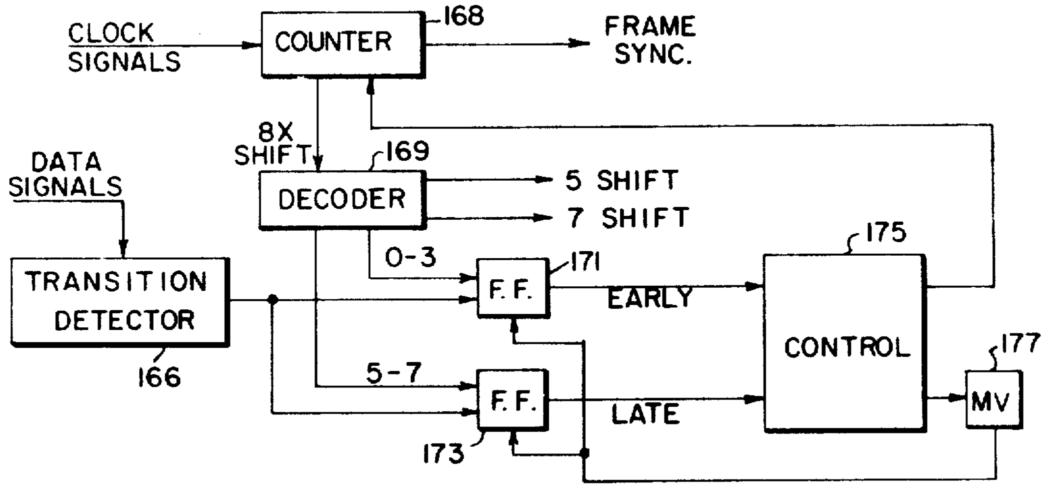
FIG. 7 is a block diagram of the phase lock loop of FIG. 6.

The phase lock loop is illustrated in greater detail in FIG. 7. The clock signals from crystal clock 154 are applied to a presettable counter 168 which is operative to provide a nominal 500 microsecond frame having 25 clocks per frame and to produce a frame sync pulse each time the counter is reset for purposes of frame synchronization. The counter 168 is operative to provide six shift output signals to decoder 169 during each frame, which when related to a bit length of 667 milliseconds effectively divides a time interval which is nominally equal to a bit length into eight intervals or shifts. These eight smaller intervals are employed by subsequent gating circuitry to determine whether data transitions are occurring at a proper time. The decoder 169 is also operative to provide a 5-shift and a 7-shift signal to shift control circuit 172 (FIG. 6) to initiate low speed shifting of shift registers 164 and 156, respectively. Word counter 174 counts 24 low speed shifts and then causes a high speed shift.

A transition detector 166 receives data signals from synchronizer 152 and provides signals representative of data transitions to a pair of flip-flops 171 and 173. A first output from decoder 169, labeled 0–3, is coupled to flip-flop 171, while a second output from the decoder, labeled 5–7, is coupled to flip-flop 173. These output signals from decoder 169 are gating signals respectively representative of portions of the eight smaller intervals into which a nominal bit length has been divided. More particularly, the gating signal applied to flip-flop 171 is representative of the 0–3 interval, while the gating signal applied to flip-flop 173 is representative of the 5–7 interval. In the illustrated embodiment, it is specified that data transitions should occur between the fourth and fifth interval. If the transition takes place between the 0–3 interval an early signal is provided by the flip-flop 171 to control circuitry 175. If the transition takes place between the 5–7 interval a late signal is applied by flip-flop 173 to control circuitry 175. Neither flip-flop is set if the transition properly occurs between shifts four and five.

The control circuitry provides a signal to counter 168 to reset the counter accordingly to compensate for errors in the time of transition detection. The counter also provides an output signal via a one shot multivibrator 177 to clear the flip-flops 171 and 173. The counter 168 nominally provides 25 clock pulses per frame cycle. If data transitions are detected to have occurred early, the control circuitry 175 is operative to reset counter 168 in its count cycle two clocks early, thereby causing the counter output signals to appear earlier in the next frame than during the frame in which it was sampled. If, on the other hand, detected data transitions occur late, counter 168 is reset by a signal from control circuitry 175 two clocks later than normal to provide a counter output signal which occurs later than normal. In this manner the counter is caused to provide a shift rail which is adjusted until detected data transitions occur at the predetermined time.

Figure 8:
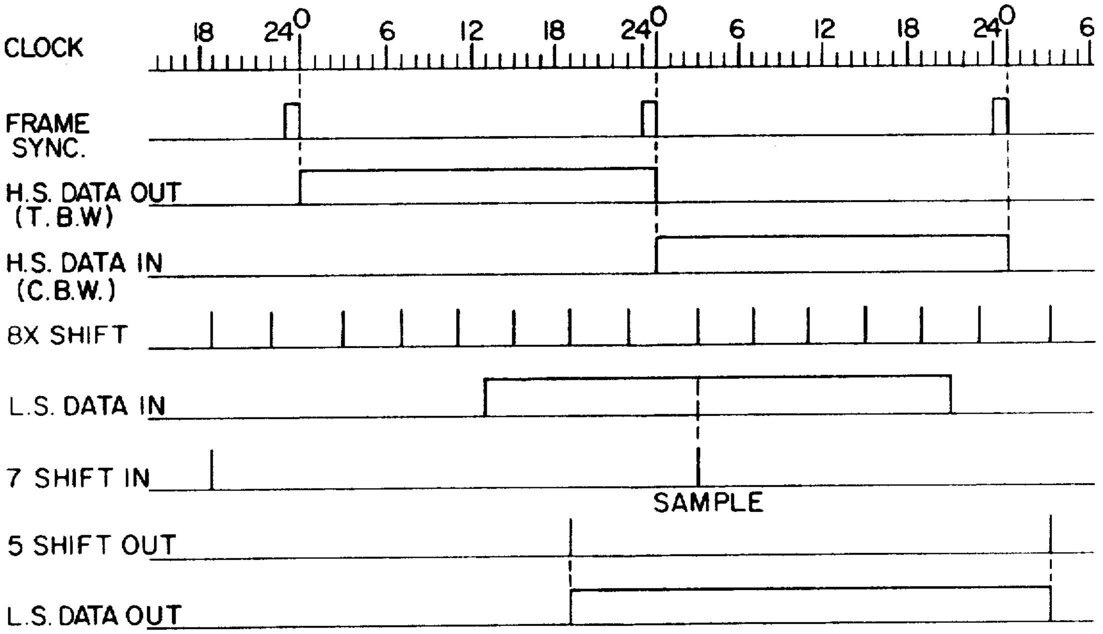
FIG. 8 is a timing diagram useful in explaining operation of the invention.

The timing of high speed and low speed shifts in the transponder and the relation therebetween is further seen in the timing diagram of FIG. 8. Of course similar timing occurs in the remote scanner 18 in communicating with scanner 10 and the telephone lines 20. The clock pulses are produced by counter 168, 25 pulses defining a nominal frame. A frame sync pulse is produced upon resetting of each counter cycle. High speed shifting of data (HS Data Out) from shift register 156 to a remote station is accomplished in the interval between an adjacent pair of frame sync pulses. High speed shifting of data (HS Data In) from a remote station into shift register 164 is accomplished between a next adjacent pair of frame sync pulses. Low speed data (LS Data In) from the modem 150 into shift register 156 is sampled at the midpoint of each bit by means of shift pulses (LS Shift In) from shift control 172 in response to the 7-shift pulse. Low speed data (LS Data Out) from shift register 164 to modem 150 for transmission is shifted out by a shift pulse (LS Shift Out) at the end of each bit, these shift pulses being produced by shift control 172 in response to the 5-shift pulses.

Referring again to FIGS. 6 an echo shift register 178 and associated display monitor 180 are provided for diagnostic and testing purposes. High speed data for a remote station can be conveyed from the output of shift register 156 to the echo shift register via gating circuit 182. Data from a remote station can be coupled from the output of gating circuit 162 to gating circuit 182 and thence into echo shift register 178. The output of the echo shift register can also be coupled via gating circuit 182 back to the input thereof. The contents of the echo shift register are transferred in parallel to a display monitor 180 for visual display of the data in the echo shift register.

By operation of the monitoring system, both TBL and CBL words can be viewed on monitor 180. And by use of an echo mode, in which the data from echo shift register 178 is shifted back into the register, the system can be isolated from the remote stations for testing purposes. For example, a data word in shift register 156, say a test pattern, can be shifted via gate 182 into echo register 178 for display on monitor 180. This word in register 178 can then be shifted via gate 162 into register 164 for transmission to remote scanner 18, while being reshifted back into register 178. Thus, the test pattern on monitor 180 can be compared with the pattern transmitted from the remote scanner and the pattern received by the remote scanner to verify system operation.

From the foregoing it should be evident that a data communication system has been provided for the efficient processing of data from a plurality of stations, certain ones of which are separated from a central processor by a link of significant communications delay. While a preferred embodiment of the invention has been described for purposes of illustration it is understood that various alternative implementations can be employed to suit particular operating requirements without departing from the spirit and true scope of the invention. For example, all stations can be remote from the central processor. Accordingly, it is not intended to limit the invention by what has been particularly shown and described except as indicated in the appended claims.

What is claimed is:

1. A data communication system for communicating with a plurality of stations at least one of which is remote from a central processor by a transmission link of significant communications delay, said system comprising:
- a central processor including a data scanner coupled to a system transmission line;
- one or more local stations each coupled to said system transmission line for time-shared communication with said central processor;
- a remote data scanner coupled to said central processor data scanner said central processor data scanner including means for providing time-shared communication with said remote data scanner;
- one or more transmission links of significant and fixed communications delay each having one end thereof coupled to said remote data scanner;
- said remote data scanner having means for compensating for the delay of said one or more transmission links to permit sequential communication by said central processor with said one or more local stations and, through said remote data scanner, with said remote stations on a time-shared basis;
- one or more transponders each coupled to a respective one of said transmission links at an end thereof opposite to said remote data scanner; and
- one or more remote stations coupled to each of said transponders.

2. The data communication system according to claim 1 wherein said remote data scanner includes for each one of said transmission links:
- first and second shift registers coupled to said central processor data scanner;
- modem means coupled to said first and second shift registers and also coupled to said one or more transmission links;
- said first shift register being operative to receive high speed serial data from said central processor data scanner and to transmit low speed serial data to said modem means;
- said second shift register being operative to receive low speed serial data from said modem means and to transmit high speed serial data to said central processor data scanner.

3. The data communication system according to claim 2 wherein each of said modem means includes a transmitting and a receiving channel adapted for coupling to respective paths of a respective one of said transmission links.

4. The data communication system according to claim 1 wherein each of said transponders comprise:
- modem means coupled to one of said transmission links;
- first and second shift registers each coupled to said modem means and each adapted for coupling to said one or more remote stations;
- said first shift register being operative to receive low speed serial data from said modem means and to convey high speed serial data to said remote stations;
- said second shift register being operative to receive high speed serial data from remote stations and to convey low speed serial data to said modem means.

5. The data communication system according to claim 1 wherein said remote data scanner includes:
- a plurality of modems each coupled to a respective one of said transmission links;
- a plurality of pairs of shift registers each pair being coupled to a respective one of said modems;
- means for applying high speed data from said central processor data scanner to one of each of said pairs of shift registers;
- means for applying low speed data from the other one of said pairs of shift registers to said central processor data scanner; and
- decoding means coupled to said plurality of shift registers and operative to selectively enable respective ones thereof to permit transfer of data from the selected shift register.

6. The data communication system according to claim 5 including timing means for determining the time intervals in which each of said shift registers is selected by said decoding means.

7. The data communication system according to claim 5 including means for monitoring data in each of said shift registers and on each of said transmission links.

8. The data communication system according to claim 1 wherein each of said transponders includes:
- means for detecting sync information received from said remote data scanner; and
- means for inhibiting transponder operation in the absence of sync detection.

9. The data communication system according to claim 1 wherein each of said transponders includes:

clock means;

means for synchronizing received data with clock pulses from said clock means;

means for adjusting the timing of said clock means in response to the transition time of received data to synchronize said clock means with the timing of said data scanner.

10. A data communication system for communicating with a plurality of stations at least one of which is remote from a central processor by a transmission link of significant communications delay, said system comprising:

a system transmission line having an insignificant communications delay;

a central processor including a data scanner coupled to said system transmission line and operative to apply data thereto and receive data therefrom;

one or more local stations, each coupled to said system transmission line for time-shared communication with said central processor;

a remote data scanner coupled to said central processor data scanner;

said central processor data scanner including means for providing time-shared communication with said remote data scanner;

one or more transmission links of significant and fixed communications delay, each having one end thereof coupled to said remote data scanner;

said remote data scanner having means for compensating for the delay of said one or more transmission links to permit sequential communication by said central processor with said one or more local stations and, through said remote data scanner, with said remote stations on a time-shared basis;

one or more transponders, each coupled to a respective one of said transmission links at an end thereof opposite to said remote data scanner;

one or more remote stations coupled to each of said transponders;

said remote data scanner including:

a plurality of data transmission means each coupled to a respective one of said transmission links and including means for receiving high speed serial data from said central processor data scanner and transmitting low speed serial data to said one or more remote stations, and further including means for receiving low speed serial data from said remote stations and transmitting high speed serial data to said central processor data scanner; and means coupled to said plurality of data transmission means and for selectively enabling respective ones thereof during predetermined time intervals of said central processor data scanner to permit transfer of data through a selected one of said transmission means between said central processor data scanner and a corresponding remote station.

11. The data communication system according to claim 10 wherein said central processor includes means for providing a time interval for each of said one or more local stations and remote stations during which said local station is communicative with said central processor.

12. The data communication system according to claim 10 wherein said central processor includes means for defining a data cycle having a series of successive frames of data followed by an interval containing sync information; and wherein said remote data scanner includes means for causing sequential transmission of a like frame of each data cycle on respective ones of said transmission links.

13. The data communication system according to claim 10 wherein said central processor includes:

means for providing a time interval for each of said one or more local stations during which each local station is communicative with said central processor;

means for providing first and second time intervals for each of said remote stations during which each remote station can respectively transmit data to and receive data from said central processor.

* * * * *